(12) United States Patent
Bennett et al.

(10) Patent No.: US 8,019,679 B2
(45) Date of Patent: Sep. 13, 2011

(54) GLOBAL COMPLIANCE PROCESSING SYSTEM FOR A MONEY TRANSFER SYSTEM

(75) Inventors: Shannon Lee Bennett, Becker, MN (US); Diana Chauvin, Minneapolis, MN (US); Billy Joe Steiger, Jr., Ovilla, TX (US); Dorilyn Lee Sletten, Maple Grove, MN (US); Peter Gore, Peterborough (GB)

(73) Assignee: Moneygram International, Inc., Minneapolis, MN (US)

( * ) Notice: Subject to any disclaimer, the term of this patent is extended or adjusted under 35 U.S.C. 154(b) by 0 days.

(21) Appl. No.: 11/874,694

(22) Filed: Oct. 18, 2007

(65) Prior Publication Data

US 2009/0106149 A1     Apr. 23, 2009

(51) Int. Cl.
*G06Q 40/00* (2006.01)
(52) U.S. Cl. ............... 705/39; 705/37; 705/38
(58) Field of Classification Search ....... 705/39
See application file for complete search history.

(56) References Cited

U.S. PATENT DOCUMENTS

| | | | |
|---|---|---|---|
| 5,326,960 A * | 7/1994 | Tannenbaum | 235/379 |
| 6,018,718 A | 1/2000 | Walker et al. | |
| 6,205,433 B1 * | 3/2001 | Boesch et al. | 705/26 |
| 6,292,786 B1 | 9/2001 | Deaton et al. | |
| 6,687,679 B1 | 2/2004 | Van Luchene et al. | |
| 6,915,271 B1 | 7/2005 | Meyer et al. | |
| 6,938,013 B1 * | 8/2005 | Gutierrez-Sheris | 705/39 |
| 7,050,983 B2 | 5/2006 | Kawai | |
| 7,213,744 B2 * | 5/2007 | Michelsen et al. | 235/379 |
| 7,258,268 B2 * | 8/2007 | Steiger, Jr. | 235/379 |
| 7,568,615 B2 * | 8/2009 | Corona et al. | 235/379 |
| 7,742,942 B2 | 6/2010 | Nicholson | |
| 2002/0111908 A1 * | 8/2002 | Milberger et al. | 705/44 |
| 2002/0152177 A1 * | 10/2002 | Wolf | 705/64 |
| 2003/0182228 A1 * | 9/2003 | Wolf | 705/39 |
| 2004/0167815 A1 | 8/2004 | DeLaHunt | |

(Continued)

OTHER PUBLICATIONS

Press release from Norkom Technologies, "Wall Street's Back Office Launches Market-Leading AML software from Norkom," Feb. 15, 2007, 2 pp., http://www.norkom.com.

(Continued)

*Primary Examiner* — Kambiz Abdi
*Assistant Examiner* — Benjamin S Fields
(74) *Attorney, Agent, or Firm* — Faegre & Benson LLP

(57) ABSTRACT

An improved money transfer system includes a rules database, a customer database, and a transaction processing system. The rules database includes information representative of transaction rules, at least some of which include an aggregation threshold. The customer database includes information representative of customers' transaction histories. The transaction processing system is connected to the rules database and customer database and includes point of entry ports, a customer identifier, a rules coordinator, an aggregation engine, and a transaction rules service. The point of entry ports receive transaction requests from points of entry and provide transaction responses to the points of entry. Based on information received in transaction requests, the customer identifier identifies customers and the rules coordinator determines applicable transaction rules. The aggregation engine determines aggregation values as a function of customers' transaction histories. The transaction rules service determines whether information received in the transaction requests meets the applicable transaction rules and causes the aggregation engine to determine aggregation values if the applicable transaction rules include aggregation thresholds. The transaction rules service generates transaction responses based upon the information received in the transaction requests along with any information received in response to any requests for additional information and any aggregation values, and updates the customer database as a function of the transaction.

20 Claims, 2 Drawing Sheets

U.S. PATENT DOCUMENTS

| | | |
|---|---|---|
| 2006/0253321 A1 | 11/2006 | Heywood |
| 2007/0088610 A1 | 4/2007 | Chen |
| 2008/0140568 A1* | 6/2008 | Henry .............................. 705/40 |
| 2008/0154719 A1 | 6/2008 | Gounares et al. |
| 2009/0063261 A1 | 3/2009 | Scribner et al. |
| 2010/0100426 A1 | 4/2010 | Sander et al. |
| 2010/0114774 A1 | 5/2010 | Linaman et al. |

OTHER PUBLICATIONS

PCT International Search Report and the Written Opinion of the International Searching Authority, mailed Jan. 20, 2009 for International Patent Application PCT/US2008/080292, 14 pages.

MoneyGram Corporate—How to transfer money, MoneyGram.International, webpages from http://www.moneygram.com/MGICorp/ConsumerProducts. . ., 5 Pages; May 30, 2007.

Banorte Selects Moneygram for US Transfers—Mexico, Apr. 17, 2002, Business News Americas—Latin America's Business Information Leader, 1 page.

MoneyGram Adds 1,500 Bancomer Locations in Mexico, Apr. 17, 2001, 2 pages.

Information on MoneyGram.com 2003-2006, archived web pages printed from www.archive.org, date is in the URL in YYYYMMDD format.

* cited by examiner

GLOBAL COMPLIANCE PROCESSING SYSTEM FOR A MONEY TRANSFER SYSTEM

TECHNICAL FIELD

The present invention relates generally to money transfer systems. In particular, the present invention is a global compliance processing system for use in connection with a money transfer system.

BACKGROUND

Businesses such as MoneyGram International offer money transfer and other services through a network of agents. A customer that desires to use these services to transfer money to a third party usually takes the money to an agent of the money transfer service. The agent accepts the money, obtains necessary information such as the customer's identity and the identity of the receiver, and initiates a transaction. The money is then made available to the receiver by another agent.

Many countries have laws and regulations (compliance requirements) relating to money transfer and similar activities. These regulations often specify limits on the nature and amount of transactions, the types of information that must be collected in connection with these activities and associated reporting requirements. For example, a country may have a rule in place that stipulates that an individual may only send or receive a specific amount of money in a year, or that businesses providing money transfer services must report how much money was transferred by a consumer out of the country during the course of the year. In addition, some countries may require collection of additional information such as a phone number or birthdate. These compliance requirements can vary with a variety of factors such as the country where the transfer originates, the country to which funds are being transferred, the amount of the transfer and the number of transfers by the customer.

Limited customer identity information, such as name and/or phone number, is typically required to initiate a transaction. In some situations, a customer may request and complete a transaction without verifying their identity to the money transfer service. It can therefore be difficult to obtain the information needed to comply with governmental laws and regulations. Case management programs such as NORKOM, available from NORKOM Technologies, can be used to analyze trends in completed transactions. The information can subsequently be used to generate currency transaction reports. However, the capability of such programs is limited. They do not have the capability of analyzing data in real time, and they are not capable of collecting data at the point of sale. Only completed transactions are reported and analyzed and the information is reviewed after the transactions have been completed.

There is therefore a need for a system capable of enhancing the compliance of money transfer transactions with regulatory transaction and reporting requirements. Any such system should be efficient and accurate.

SUMMARY

The present invention is an improved money transfer system. One embodiment of the system includes a rules database, a customer database, and a transaction processing system. The rules database includes information representative of transaction rules, at least some of which include an aggregation threshold. The customer database includes information representative of customers' transaction histories. The transaction processing system is connected to the rules database and customer database and includes point of entry ports, a customer identifier, a rules coordinator, an aggregation engine, and a transaction rules service. The point of entry ports receive transaction requests from points of entry and provide transaction responses to the points of entry. Based on information received in transaction requests, the customer identifier identifies customers and the rules coordinator determines applicable transaction rules. The aggregation engine determines aggregation values as a function of customers' transaction histories. The transaction rules service determines whether information received in the transaction requests meets the applicable transaction rules and causes the aggregation engine to determine aggregation values if the applicable transaction rules include aggregation thresholds. Also, the transaction rules service generates transaction responses based upon the information received in the transaction requests along with any information received in response to any requests for additional information and any aggregation values, and updates the customer database as a function of the transaction.

DETAILED DESCRIPTION

System 10 Overview

Figure 1:
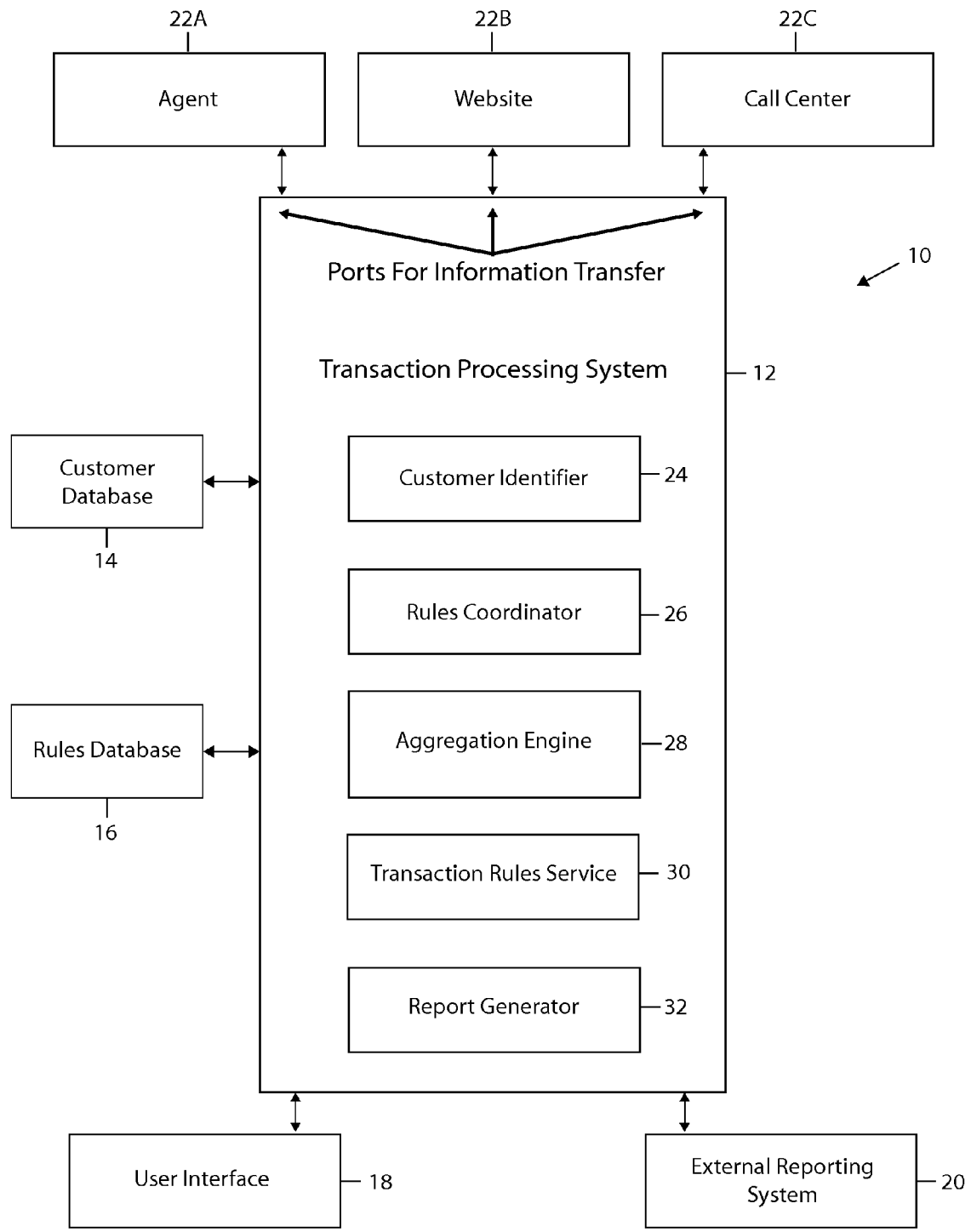
FIG. 1 is a block diagram of the components of a money transfer system for implementing global aggregation in accordance with the present invention.

FIG. 1 is a block diagram of a money transfer system 10 for providing global compliance processing in accordance with one embodiment of the present invention. Money transfer system 10 collects data and aggregates money transfer activities from agents and customers from a range of locations and geographic areas using a compliance and aggregation rules platform that is integrated with key points of entry and impacted databases and infrastructures. The collection of information and aggregation of transactions applies to send and/or receive activities, and may apply to consumer-to-consumer money transfer transactions, bill payments, money orders, express payment transactions, and other transactions and products in which at least a name, address or phone number are required to complete the transaction. By having the ability to collect and aggregate various categories of information, institutions offering money transfer services will be able to more closely monitor and react to transactions. For example, if possible misuse has been identified, money transfer system 10 may be locked down, either completely or at a particular agent location. Tools may also be implemented into money transfer system 10 that have the ability to identify and lock out known fraudsters or specially designated nationals. In addition, money transfer system 10 may be able to link different transactions together, for example, transactions from a single household.

As shown in FIG. 1, money transfer system 10 includes transaction processing system 12 interfaced to customer database 14, rules database 16, and user interface terminal 18. An external reporting system 20 is also interfaced to transaction processing system 12. Customers may access money transfer system 10 through points of entry, shown as agent terminal 22A, website terminal 22B, and call center terminal 22C in the illustrated embodiment. Various telecommunications devices can be easily adapted for use as a point of entry. Each of terminals 22A-22C is located at a store or other customer-accessible facility of one of the network of agents providing money transfer services through system 10. The agents operating terminals 22A-22C can be independent contractors operating under contractual arrangements with the operator of money transfer system 10. In addition or alternatively, terminals 22A-22C may be located at facilities of the operator of money transfer system 10. In one embodiment, website terminal 22B and call center terminal 22C may be accessed from a customer's home. Although FIG. 1 depicts only one agent terminal 22A, one website terminal 22B, and one call center terminal 22C, money transfer system 10 may include any number of terminals. Typically, a much larger (e.g., worldwide) network of agents, websites, and call centers will have terminals such as 22A-22C.

Customer information is stored in customer database 14 and is used to identify transactions associated with a particular customer. Each time a transaction is requested, customer database 14 is updated such that a current summary of a customer's transaction histories is available. Thus, it is important that the identity of each customer is verified at the time of each transaction. This may be accomplished by requiring personal information such as date of birth or social security number from the customer or by asking for proper identification such as a driver's license, passport or government identification.

Rules database 16 stores transaction rules, which may be geographic, a regulatory body, or agent specific. The rules are pre-established using data elements including, but not limited to: send and receive frequency, number of transactions, type of transaction, period of time, and transaction value. At least some of the rules includes an aggregation threshold that when met, triggers a particular response. For example, when an aggregation threshold is met, a transaction may be declined or additional information may be requested. Examples of aggregation thresholds include, but are not limited to: aggregated send threshold amount limits over predetermined periods of time, aggregated receive threshold amount limits over predetermined periods of time, aggregated number of send transactions over predetermined periods of time, and aggregated number of receive transactions over predetermined periods of time.

Transaction processing system 12 interfaces with point of entry terminals 22A-22C and provides any information required to complete a transaction on the screens or other interfaces of terminals 22A-22C as well as other relevant messages. For example, transaction processing system 12 may indicate to the agent or customer on the screen of terminal 22A-22C when and what additional information is needed to complete the transaction, when the transaction has been authorized, or when the transaction has been declined.

Transaction processing system 12 includes customer identifier 24, rules coordinator 26, aggregation engine 28, transaction rules service 30, and report generator 32. Customer identifier 24 associates a customer, based on information collected from a transaction request, to stored customer records available in customer database 14. Generally, rules coordinator 26 establishes a hierarchy of rules when a set of the transaction rules are a function of common data elements. When a rule associated with a requested transaction includes an aggregation threshold, aggregation engine 28 determines what information is needed and initiates collection of the information from customer database 14. Aggregation engine 28 then determines an aggregation value based on the transaction information received and information from customer database 14 and sends that information to transaction rules service 30. Transaction rules service 30 compares the aggregation value with the applicable rules from rules database 16, determines whether an aggregation threshold is met, and generates a transaction response. When requested, report generator 32 gathers information available in transaction processing system 12 and provides real-time information to the requester.

Transaction processing system 12 also performs functions in addition to those mentioned for consumer identifier 24, rules coordinator 26, aggregation engine 28, transaction rules service 30, and report generator 32. For example, because transactions initiated by the same customer may originate from various countries, the currency of the transaction may need to be converted prior to aggregating the transaction amount with the information stored in customer database 14.

User interface terminal 18 enables an administrator to update and add new rules to rules database 16 as necessary or desired. The updates may be applied in real time or can be set to activate at a future time. User interface terminal 18 may also be used for other administrative purposes.

As described in greater detail below, external reporting system 20 receives information relating to transaction requests received at point of entry terminals 22A-22C, including, but not limited to: information regarding the identity of the customer, the country of origin, the destination country, the transaction type, the frequency of transactions, and the value of the transaction. Using this information, external reporting system 20 can generate relevant reporting information to comply with national regulations.

Figure 2:
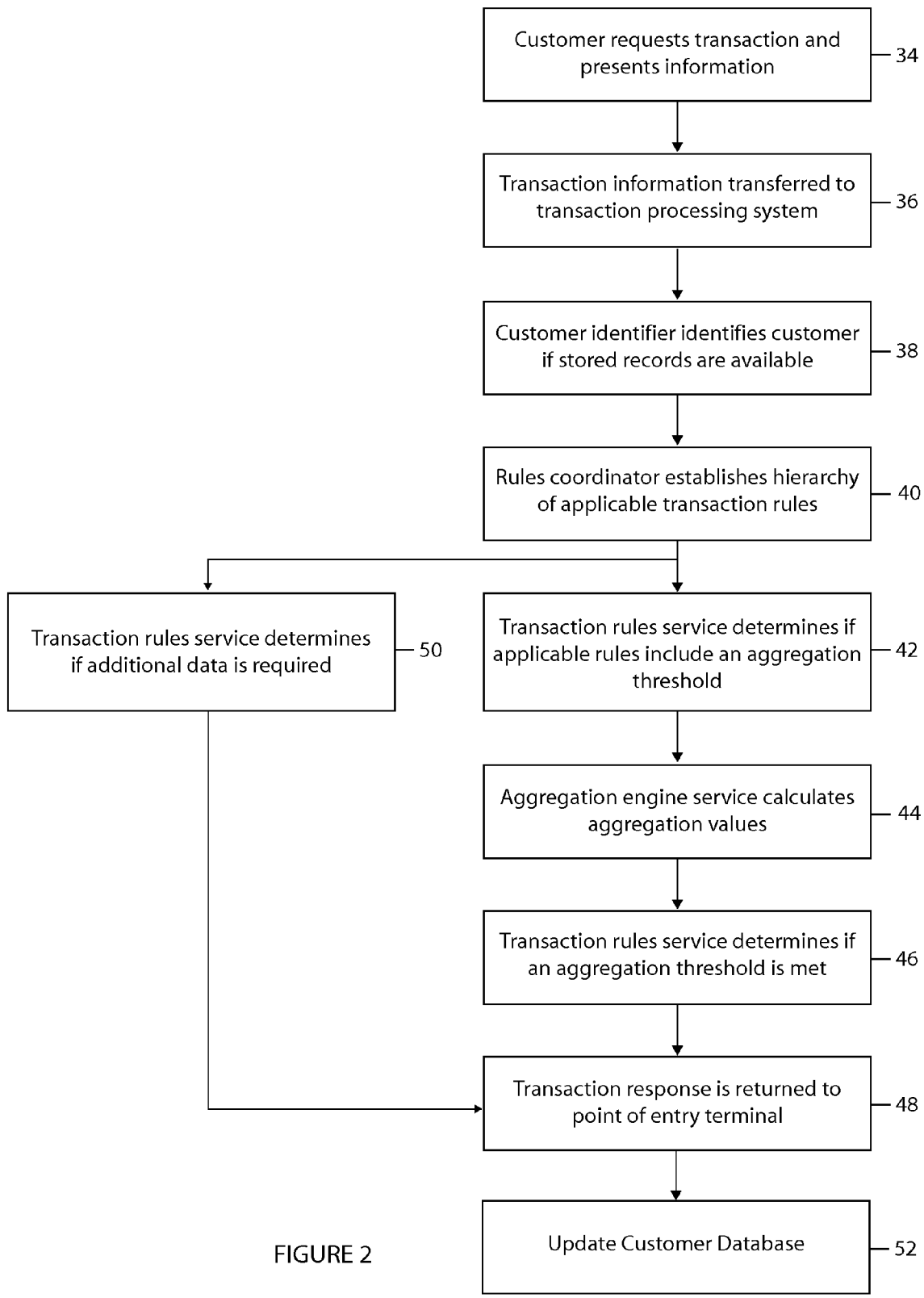
FIG. 2 is a flow diagram of a money transfer transaction performed using the system shown in FIG. 1.

FIG. 2 is a flow chart describing the general operation of system 10 during a money transfer transaction, including the use of global aggregation components. As shown in step 34, a customer requesting a transaction first provides the agent with the appropriate transaction information (e.g. identification, amount of transfer, receiver, and send location). In some embodiments, the name and/or telephone number of the customer may be accepted as identification. In another embodiment, a membership card with the customer's name and a unique identifier number may be given as identification. In this case, the customer name will have been previously linked to the unique identifier number in customer database 14 at the time the card was issued. However, the presentment of the membership card itself may or may not be required. For example, if appropriate identification information is presented by the customer, the agent can access transaction processing system 12 to determine the customer's unique identifier number.

The transaction information is entered into one of point of entry terminals 22A-22C and transferred to transaction processing system 12 as shown in step 36. Customer identifier 24 identifies the customer based on information received from the transaction request and information in customer database 14 (step 38). The information is then sent to rules coordinator 26 to determine the applicable transaction rules (step 40). Transaction rules service 30 analyzes the applicable transaction rules to determine whether any of the applicable transaction rules includes an aggregation threshold as shown in step 42. If any of the applicable transaction rules includes an aggregation threshold, transaction rules service 30 causes aggregation engine 28 to aggregate the information in customer database 14 with any applicable transaction information to determine any applicable aggregation values (step 44).

As shown in step 46, transaction rules service 30 determines from the applicable transaction rules in rules database 16 and the aggregation value whether an aggregation threshold has been met and generates the appropriate transaction response. A transaction response requesting additional information from the customer is generated if additional information is needed to determine if the applicable transaction rules are met. A transaction response authorizing the transaction request is generated if the information received in the transaction requests, including any information received in response to additional information requests and any aggregation values, meet the applicable rules. A transaction response denying the transaction request is generated if the information received in the transaction requests, including any information received in response to additional information requests and any aggregation values, do not meet the applicable rules. Once the appropriate transaction response is determined, the transaction response is returned to point of entry terminal 22A-22C (step 48).

As previously mentioned, additional information may be required to determine whether a transaction request should be allowed to proceed or whether a transaction request should be denied. Thus, after the hierarchy of applicable transaction rules is determined, transaction rules service 30 determines if additional data is required (step 50). If additional data is required, transaction rules service 30 sends a request to point of entry terminal 22A-22C for the additional information. If no additional data is required, transaction rules service 30 proceeds to step 42 to determine if the applicable rules include an aggregation threshold.

As shown in step 52, after the appropriate transaction response is returned to point of entry terminal 22A-22C, customer database 14 is updated to reflect the transaction request.

A more detailed description of various components of money transfer system 10 and its operation follow below.

Terminals 22A-22C

Terminals 22A-22C can be interfaced to transaction processing system 12 through conventional data and information communication ports. Entry of the customer's information, such as name, phone number, or membership number into one of terminals 22A-22C can be accepted as an identifier by transaction processing system 12 for purposes of identifying the customer. Terminals 22A-22C can validate the identity of the customer at the time of entry. Once verified, the identity of the customer is transferred to customer database 14 to access available information on the customer.

Each of terminals 22A-22C can display and print informational messages or receipts with information including transaction confirmations and the aggregated transaction amounts over a period of time (e.g. month-to-date, year-to-date, since membership enrollment). Informational messages provided by transaction processing system 12 can, for example, alert the agent and/or customer that the next transaction will be limited to a particular amount or that the customer may not complete another transaction for a period of time. The message can also provide the agent with instructions to deny the transaction. It should be noted that including the aggregated transaction amounts on the print receipts is optional. For example, when the global aggregation system is used to analyze the transaction histories of particular customers to find trends to determine suspicious activity, aggregated transaction amounts may not be included on the print receipts so that the customer will not be alerted to the fact that his/her transactions are being monitored.

In an exemplary embodiment, only a limited amount of information may be conveyed back to the customer or the agent at terminal 22A-22C. For example, money transfer system 10 may be set up such that only information that was collected at that agent location can be returned to the customer or agent. If the agent has more than one location, money transfer system 10 will be able to aggregate a customer's transactions and report back to the agent if the customer reaches a threshold that requires reporting or collection of more data. Thus, if the customer had previously completed a transaction at a different agent's terminal 22A-22C of money transfer system 10, the only information that is returned to the customer or agent is the information that is always collected in order to complete a transaction, regardless of the location of terminal 22A-22C.

As customer information such as address or telephone number may change from time to time, the ability to change customer information should be made available at terminals 22A-22C. For example, a pop-up/text field type function may be made available at terminals 22A-22C to allow the agent or the customer to enter in new text to the customer information.

Customer Database 14

Information identifying a customer and the customer's transaction histories are stored in customer database 14. The information may either be manually entered or scanned into customer database 14 to eliminate paper copies. The stored identification information may include any information that may be required to complete a transaction. For example, the stored identification information can include, but is not limited to: customer name, address, telephone number, customer number, membership number in a loyalty program, membership expiration date, membership issuance date, membership issuer, email address, date of birth, nationality, nationality at birth, place of birth, and profession. As previously mentioned, when performing a transaction, proof of date of birth, nationality, place of birth, or other information may be required to prove the identity of the customer. This may be mandated at the country or agent level. Specific customer or country compliance regulations may require transmittance of specific information to complete a transaction. However, a minimum set of criteria, or standard fields, can be required by default. From this minimum set of criteria, a customer should be able to be positively identified within customer database 14. In an exemplary embodiment, the minimum set of criteria may include the first and last name of the customer, date of birth, and current address or telephone number.

Stored information associated with each customer transaction in customer database 14 can include, but is not limited to: whether it is a send or receive transaction, send and receive frequency, number of transactions, sender, receiver, transaction amount, location of origin, destination location, agent, type of transaction, time of the transaction, and date of the transaction. Each transaction history is associated with one customer and one unique identifying number in one embodiment of the invention. Up to ten years of transaction history are stored for customers in one embodiment of the invention, although transaction histories over longer and shorter periods of time are stored in other embodiments.

A comment field may also be made available to an agent to add information to customer database 14 regarding a customer. For example, it may be desirable to add information to the stored record of a customer that has been flagged for purposes of reviewing the activity of the customer. The information may provide instructions for processing a transaction of the customer or reporting it as suspicious. This information may be added at terminals 22A-22C by the agent or at user interface 18 by an administrator. If the information is added by an administrator at user interface 18, the comment field can be returned to the agent at terminal 22A-22C so that the agent will know how to proceed based on the comments entered on previous transactions for that customer.

Rules Database 16

Rules database 16 stores data defining transaction rules associated with the global compliance processing system of money transfer system 10. Rules database 16 enables the definition and real-time enforcement of the transaction rules, including the ability to change existing rules and create new rules (through user interface 18). Information representative of transaction rules developed to determine whether a requested transaction should be authorized or declined is configured within rules database 16. Exemplary transaction rules include: transaction type-based rules, point of entry-based rules, customer-based rules, and transaction location-based rules. A particular example of a customer-based rule may be based on the identity of the individual sending or receiving the transaction. The Office of Foreign Asset Control prohibits certain individuals from receiving or sending money transfers. Particular examples of transaction location-based rules may be based on the country of origin, the destination country, or geographic targeting order. The geographical targeting order may include the particular region, state, city, or zip code of the country of origin or destination. A combination of rules may also be implemented. For example, there may be a rule for a particular agent at a particular location.

In order to process all the information and determine the appropriate course of action, rules database 16 is linked to customer database 14, customer identifier 24, rules coordinator 26, aggregation engine 28, and transaction rules service 30 by transaction processing system 12.

Transaction processing system 12 can also have the ability to enable and disable rule sets of rules database 14 for a particular agent, agent location, geographic targeting order, or country. In addition, the applicable transaction rules and aggregation thresholds can be set for each country and can be linked to the individual identification requirements or rules of each country.

Customer Identifier 24

Identification and verification of the customer is important to the accuracy of the global aggregation component of money transfer system 10. Customer identification enhances the ability of transaction processing system 12 to properly aggregate transaction information and collect required data on both send and receive transactions at varying thresholds. Customer identifier 24 uses the information collected from the customer in the requested transaction to associate the customer with information that is stored in customer database 14. Transaction processing system 12 can then aggregate the information given by the customer for the present transaction with the information in customer database 14. From the aggregated information, it can be determined whether the particular customer exceeds any transaction rule aggregation threshold stored in rules database 16.

In an exemplary embodiment, a third party solution can generate a customer identification (ID) number based on limited customer data elements. Customer identifier 24 will then have the capability to identify subtle patterns in the customer data elements and link them to a particular customer when the data supports a single customer record. For example, when a customer uses different combinations of data elements on a series of transactions. The ID number will be used to execute the transaction rules requiring customer identification or aggregation. An example of a suitable third party solution is Entity Analytic Solutions, available from International Business Machines Corp. (IBM), Armonk, N.Y.

Rules Coordinator 26

Rules coordinator 26 provides rule functionality by determining what rules apply to a requested transaction if several rules are applicable. Rules coordinator 26 selects the dominating rule based on the applicable information for all rules that have common data. For example, if a number of rules have common data, rules coordinator 26 may first apply a rule based on the individual customer, then apply a rule based on the agent overseeing the transaction, and then apply a rule based on the country of origin.

The rules may be configurable by a number of variables, including, but not limited to: agent, agent locations, country, state, and geographical targeting order (GTO). For example, in one embodiment, rules coordinator 26 may provide a rule hierarchy by agent, country, state, city, and postal code. In another embodiment, rules coordinator 26 may provide a rule hierarchy by customer.

Aggregation Engine 28

Transactions may be aggregated by any number of categories, including, but not limited to: customer, agent, agent location, main office, state, county, and geographic targeting order. As previously mentioned, at least some of the rules in rules database 16 include an aggregation threshold. Aggregation engine 28 tracks and enforces the aggregation thresholds by calculating an aggregation value as a function of a customer's transaction histories if specified by the applicable rule and the customer's pending transaction request. When one of the rules having an aggregation threshold is triggered, aggregation engine 28 collects data from customer database 14 to determine an aggregation value. In some situations, the data from customer database 14 is combined with data in the transaction request to determine the aggregation value. In this case, the aggregation value is the combination of a customer's past transactions and the current requested transaction.

The aggregation value is determined on a real-time basis to ensure that the requested transaction will be in compliance with any applicable rules prior to authorizing the transaction. In one embodiment, aggregation engine 28 may be configured to aggregate values in customer database 14 at predetermined times, such as every hour, every day at a particular time, every week at a particular time, etc. In another embodiment, aggregation engine 28 may be configured to aggregate values in customer database 14 only when a value is entered into a particular field at terminal 22A-22C.

Examples of aggregation thresholds include transaction value thresholds, transaction volume thresholds, transaction value thresholds within a designated period of time, and currency exchange thresholds. A particular example of a transaction value threshold is when a transaction exceeds X dollar amount allowed. A particular example of a transaction volume threshold is when X number of transactions exceeds Y number allowed. A particular example of a transaction value threshold within a designated period of time is when X total aggregated value or volume over Y timelines. The timelines may range anywhere from one day to one year. The timelines may also include shorter or longer durations, depending on the intended use.

The aggregated information can be stored in transaction processing system 12 to allow reporting to regulatory bodies or agent locations.

Transaction Rules Service 30

Transaction rules service 30 tracks and enforces the transaction rules in rules database 16 by working in conjunction with rules database 16 and aggregation engine 28. One function of transaction rules service 30 is to determine what information is needed to determine which transaction rules are applicable for a particular requested transaction. Upon determining what information is needed, transaction rules service 30 checks the information provided in the transaction request and in customer database 14 to determine whether the information needed is available. If the information is not provided or otherwise available from either the transaction request or customer database 14, transaction rules service 30 initiates collection of the information by prompting the agent or customer at terminal 22A-22C to provide the needed information. The information collected from the agent or customer is then used by transaction rules service 30 to determine if the minimum information required for the applicable transaction rules is available. If the minimum amount of information has been provided and the applicable transaction rules do not include an aggregation threshold, transaction rules service 30 provides the proper transaction response to terminal 22A-22C.

When the applicable transaction rules do include an aggregation threshold, transaction rules service 30 sends the additional information collected from the agent or customer to aggregation engine 28 to determine the aggregation values. After the aggregation values have been determined, the aggregation values are sent to transaction rules service 30. Transaction rules service 30 then determines whether an aggregation threshold has been met or exceeded based upon the applicable rules from rules database 16 and the aggregation values. If no aggregation thresholds have been met or exceeded, the transaction is authorized. If an aggregation threshold has been met or exceeded, the transaction is either declined or additional information is requested from the customer to determine whether the transaction can proceed. For example, if a customer requests a transaction over a predetermined value, a country may have a rule that requires the customer to provide additional documentation to complete the transaction, such as a second form of identification. If the customer is able to provide the additional documentation, then the transaction is allowed to proceed. Thus, completion of the transaction may depend on a conditional rule, or meeting a specific condition. Once that condition is satisfied, the transaction is allowed to proceed.

When a transaction has been denied, a message is sent back to the agent at terminal 22A-22C to let the agent know that they cannot complete the transaction. Optionally, agents may also be required to complete a currency transaction report when a transaction limit has been exceeded or an aggregation limit has been reached.

Report Generator 32

Report generator 32 can generate reports on a particular customer within customer database 14 and provide real-time information on the transaction histories of the customer. Report generator 32 can also generate information and reports based on various categories, including, but not limited to: customer (sender), receiver, country of origin, destination country, transaction amount, transaction frequency based on a customer, and agent. A report may also be generated based on any combination of the above information categories.

User Interface 18

User interface 18 provides a mechanism for flexible data collection, including the ability to collect new fields that do not currently exist. Other functions user interface 18 may allow an administrator to perform include, but are not limited to: view, add, change, or delete rules; provide a free formatted notes or text area that allows the administrator to document why a rule was modified; view, add, change, or delete persons authorized to maintain or view rules; provide the ability to search a particular rule; determine and modify the hierarchy of rules in rules database 16; provide the ability to key in a future date and/or time to enable a rule or provide an end date and/or time to disable a rule; audit all changes, additions, and deletions made to a rule; access who made any modifications to a rule, when the modifications where made, the function performed, and the value added, changed, or deleted; provide the ability to import and export a selected range of rules; provide a mean by which a rule or group of rules may be printed out; provide the ability to view, access, or report audit and capture information; provide the ability to archive old or deleted rules; and provide the ability to test new, modified, or deleted rules in an external environment.

For example, rules database 16 may on occasion need to be updated to include rules specific to a particular country or a new regulation. User interface 18 allows an administrator to communicate any rule update information to transaction processing system 12. Transaction processing system 12 subsequently updates rules database 16, in real time or at a scheduled time, as a function of the rule update information provided by the administrator.

In an exemplary embodiment, user interface 18 may be configured to recognize the location of the agent or customer at terminal 22A-22C.

User interface 18 also allows an administrator the ability to control the display and the required or optional status of existing fields at terminals 22A-22C.

External Reporting System 20

External reporting system 20 is interfaced to transaction processing system 12 through conventional data or information communication ports and can be located in close physical proximity to, or remotely from, transaction processing system 12. External reporting system 20 provides a number of analyzing and reporting functions for compliance with regulatory mandates for information regarding the transfer of money. Although not shown in FIG. 1, external reporting system 20 includes user interfaces and software tools in connection with these functions.

Many countries require reports from the financial institutions within its borders. For example, in the United States, the Bank Secrecy Act requires certain reports from financial institutions within the country. Collection of data may be made available based on the information required by each particular country. For example, different countries may require different combinations of the following categories: information regarding the identity of customers transferring money, the identity of customers receiving money, the number of transactions originating from a particular country, the number of transactions being sent to a particular destination country, the frequency of transactions originating from a particular country, the frequency of transactions being sent to a particular destination country, the types of transactions being completed, the value of transactions being requested, and the value of transactions being completed.

External reporting system 20 can receive information from transaction processing system 12 and organize the information into a report for the requesting organization. The reports may be provided in formats such that they may be viewed and/or exported to programs such as CSV, Excel, converted to PDF files, or printed.

The money transfer system of the present invention includes a global aggregation component that allows information having a common data point to be aggregated. Based on a predetermined set of transaction rules, transaction requests of a customer can be monitored in real-time such that the system can authorize the transaction, decline the transaction, or ask the customer for more information before completion of the transaction. The transaction rules may include an aggregation threshold that limits the completion of a transaction. If the aggregation threshold is not met, the transaction is typically allowed to proceed. If the aggregation threshold is met, a response is triggered to either request additional information from the customer or to stop the transaction. In addition, the system is also capable of organizing data and generating reports tailored to the needs and requests of a particular organization.

Although the present invention has been described with reference to preferred embodiments, those skilled in the art will recognize that changes can be made in form and detail without departing from the spirit and scope of the invention. In particular, although components of the transaction processing system are shown and described as different physical elements, these components can alternatively be different logical components of one or more common physical components of the system. Although described in connection with a money transfer system, the invention can also be used in connection with other products provided by the operator of the system, including bill pay, money orders, gift cards, etc.

The following is claimed:

1. A money transfer system responsive to money transfer requests received through terminals at points of entry during transaction request sessions, for processing the money transfers transfer requests and providing enforcement of governmental money transfer compliance requirements by providing responses to the associated money transfer requests during the transaction request sessions and through the terminals at points of entry to stop the completion of a money transfer transaction that would not comply with the governmental money transfer compliance requirements, comprising: a rules database including information representative of transaction rules defining governmental money transfer compliance requirements including transaction location-based rules and optionally one or more of transaction type-based rules, point of entry-based rules and customer-based rules, wherein at least some of the transaction rules include an aggregation threshold including one or more of transaction value thresholds, transaction volume thresholds, transaction value thresholds within a designated period of time and currency exchange thresholds; a customer database including information representative of customers' transaction histories including transaction origin location information and transaction destination location information; and a transaction processing system connected to the rules database and customer database, the transaction processing system comprising: point of entry ports adapted to be coupled for communication with terminals at points of entry to receive money transfer transaction requests from the points of entry, to receive additional information in response to additional information request prompts from the points of entry, to provide additional information request prompts to the points of entry, and to provide transaction responses to the points of entry, wherein the transaction requests have transaction information including transaction origin location and transaction destination location; a customer identifier to identify customers as a function of information received in transaction requests; a rules coordinator to determine one or more applicable transaction rules, including location-based rules, that apply to a transaction as a function of the transaction information received in transaction requests; an aggregation engine to calculate aggregation values as a function of customers' transaction histories and the applicable transaction information received in the transaction requests; and a transaction rules service to: determine for each money transfer transaction request whether information needed for applicable transaction rules applicable to the transaction request was received in the transaction requests request and available in the customer database; provide an additional information request prompt to the point of entry port during the transaction request session if additional information is needed for applicable transaction rules applicable to the transaction request, wherein the additional information request prompt for the transaction request is provided before generating a transaction authorization or a transaction denial for the transaction request; cause the aggregation engine to determine aggregation values associated with the transaction request during the transaction request session and before generating a transaction authorization or a transaction denial if the applicable transaction rules include an aggregation threshold; generate a transaction response to the money transfer request during the transaction request session based on the customer's transaction history, information received in the transaction request, information received in the transaction request, any additional information received in response to an additional information request prompt and any aggregation values, the transaction response including a transaction authorization allowing completion of the transaction or a transaction denial preventing completion of the transaction; provide the transaction response to the point of entry port during the transaction request session in response to the money transfer transaction request; and update the customer database as a function of the transaction; and wherein the system stops the completion of a money transfer transaction during the transaction request session when a transaction denial is generated.

2. The money transfer system of claim 1, wherein the money transfer system further comprises an administrator port to communicate rule update information to the transaction processing system.

3. The money transfer system of claim 2, wherein the transaction processing system updates the rules database as a function of the rule update information.

4. The money transfer system of claim 1, and further comprising an external reporting system interfaced with the transaction processing system to communicate transaction information to external data processing systems.

5. The money transfer system of claim 1, wherein the transaction processing system further includes a report generator to generate reports based on information in the customer database.

6. The money transfer system of claim 5, wherein the report generator generates reports based on one or more of customer identity, transaction send location, transaction receive location, transaction value, and transaction frequency.

7. The money transfer system of claim 1, wherein the rules database includes information representative of transaction rules having one or more of aggregated send threshold amount limits over predetermined periods of time, aggregated receive threshold amount limits over predetermined periods of time, aggregated number of send transactions over predetermined periods of time, and aggregated number of receive transactions over predetermined periods of time.

8. A money transfer system comprising: a rules database including information representative of transaction rules defining governmental money transfer compliance requirements, comprising: transaction type-based rules; point of entry-based rules; customer-based rules; and transaction location-based rules; wherein at least some of the transaction rules include an aggregation threshold including one or more of transaction value thresholds, transaction volume thresholds, transaction value thresholds within a designated period of time and currency exchange thresholds; a customer database including information representative of customers' transaction histories including transaction origin location information and transaction destination location information; a transaction processing system connected to the rules database and customer database, comprising: point of entry ports adapted to be coupled for communication with terminals at points of entry to receive transaction requests from the points of entry to receive transaction requests from points of entry, to receive additional information in response to additional information request prompts from the points of entry, to provide additional information request prompts to the points of entry and to provide transaction responses to the points of entry, wherein the transaction requests have transaction information including transaction origin location and transaction destination location; a customer identifier to identify customers as a function of information received in transaction requests; a rules coordinator to determine applicable transaction rules, including location-based rules, that apply to a transaction as a function of the transaction information received in transaction requests; an aggregation engine to calculate aggregation values as a function of customers' transaction histories and the transaction information received in the transaction requests; and a transaction rules service to: determine during a transaction request session for each money transfer transaction request whether information needed for applicable transaction rules was received in the transaction request and available in the customer database; generate during the transaction request session additional information request prompts requesting additional information if additional information is needed to meet the applicable transaction rules and providing the additional information request prompts to the point of entry ports during the transaction request session, wherein the additional information request prompts are generated and provided to the point of entry ports before generating a transaction authorization or a transaction denial for the associated transaction request; cause the aggregation engine to determine aggregation values during the transaction request session and before generating a transaction authorization or a transaction denial if the applicable transaction rules include aggregation thresholds; generate transaction authorizations during the transaction request session authorizing completion of transactions if the information in the customers' transaction histories and received in the transaction requests, including any information received in response to additional information request prompts and any aggregation values, meet the applicable transaction rules and providing the transaction authorizations to the point of entry ports during the transaction request session; generate transaction denials during the transaction request session denying completion of transactions if the information in the customers' transaction histories and received in the transaction requests, including any information received in response to additional information request prompts and any aggregation values, do not meet the applicable transaction rules and providing the transaction responses denying the transactions denials to the point of entry ports during the transaction request session; and update the customer database as a function of the transactions; and wherein the system stops the completion of a money transfer transaction during the transaction request session when a transaction denial is generated; and an administrator port to communicate rule update information, wherein the transaction processing system updates the rules database as a function of the rule update information.

9. The money transfer system of claim 8, and further comprising an external reporting system connected to the transaction processing system to communicate transaction information to external data processing systems.

10. The money transfer system of claim 8, wherein the transaction processing system further includes a report generator to generate reports based on information in the customer database.

11. The money transfer system of claim 10, wherein the report generator generates reports based on one or more of customer identity, transaction send location, transaction receive location, transaction value and transaction frequency.

12. The money transfer system of claim 8, wherein the rules database includes information representative of transaction rules having one or more of aggregated send threshold amount limits over predetermined periods of time, aggregated receive threshold amount limits over predetermined periods of time, aggregated number of send transactions over predetermined periods of time, and aggregated number of receive transactions over predetermined periods of time.

13. A method for operating a transaction processing system interfaced to a customer database, a rules database and points of entry to process money transfer requests subject to governmental money transfer compliance requirements, comprising: receiving at the transaction processing system a transaction request from a point of entry, wherein the transaction requests have transaction information including transaction origin location and transaction destination location; storing customer identification and transaction histories including transaction origin location information and transaction destination location information in a customer database; processing the transaction request to identify a customer in the customer database based on the transaction request received and information stored in the customer database; processing the transaction request, including accessing the rules database to determine during a transaction request session applicable transaction rules, wherein the transaction rules define governmental money transfer compliance requirements including transaction location-based rules and optionally one or more of transaction type-base rules, point of entry-based rules and customer-based rules, wherein the transaction rules have at least some aggregation thresholds including one or more of transaction value thresholds, transaction volume thresholds, transaction value thresholds within a designated period of time and currency exchange thresholds; processing the transaction request to determine during the transaction request session whether information needed for transaction rules applicable to the transaction request was received in the transaction request and available in the customer database; providing an additional information request prompt to the point of entry during the transaction request session if additional information is needed for transaction rules applicable to the transaction request, wherein the additional information request prompt is provided before generating a transaction authorization or a transaction denial for the transaction request; receiving additional information in response to additional information request prompts; processing the transaction request to determine during the transaction request session whether any aggregation thresholds are met based on transaction histories in the customer database and the transaction information received in the transaction requests; processing the transaction request, including calculating aggregation values, to determine during the transaction request session a transaction response based on the customers' transaction histories, the information received in the transaction requests any additional information received in response to additional information request prompts, the applicable transaction rules and the aggregation thresholds, wherein the transaction response includes a transaction authorization authorizing completion of a transaction if the applicable transaction rules are met, and the transaction response includes a transaction denial denying completion of a transaction if the applicable transaction rules are not met: and returning the transaction response from the transaction processing system to the point of entry during the transaction request session; and stopping the completion of a money transfer transaction during the transaction request session when a transaction response in the form of a transaction denial is returned to the point of entry.

14. The method of claim 13, and further comprising generating a report based on one or more of customer identity, transaction send location, transaction receive location, transaction value, and transaction frequency.

15. The method of claim 13, wherein returning the transaction response comprises generating a response requesting additional information from the customer if the aggregation value is equal to or greater than the aggregation threshold.

16. The method of claim 13, wherein returning the transaction response comprises generating a response declining the transaction request if the aggregation value is equal to or greater than the aggregation threshold.

17. The method of claim 13, wherein returning the transaction response comprises generating a response accepting the transaction request if the aggregation value is less than the aggregation threshold.

18. A method for operating a money transfer system interfaced to a customer database, a rules database and points of entry to process a money transfer request subject to governmental money transfer compliance requirements, comprising: receiving at the money transfer system transaction information from a transaction request at a point of entry, wherein the transaction information includes transaction origin location and transaction destination location; processing the transaction request to determine compliance requirements for the transaction request, including accessing a rules database including information representative of transaction rules defining governmental money transfer compliance requirements including transaction location-based rules and optionally one or more of transaction type-based rules, point of entry-based rules and customer-based rules, and wherein at least some of the transaction rules include an aggregation threshold including one or more of transaction value thresholds, transaction volume thresholds and transaction value thresholds within a designated period of time; processing the transaction request to determine compliance with the determined compliance requirements based on the information in the transaction request during a transaction request session, including accessing a customer database including information representative of customers' transaction histories including transaction origin location and transaction destination location and calculating aggregation values as a function of the customers' transaction histories and the transaction information received in the transaction requests; providing additional information request prompts during the transaction request session before sending any notice to reject the transaction if additional information is needed to determine compliance; and sending a notice to the point of entry during the transaction request session to reject the transaction request and stopping completion of the transaction if the transaction request does not comply with the compliance requirements.

19. The method of claim 18, wherein the step of sending a notice includes generating a pop up window on the point of entry alerting an agent to cancel the transaction.

20. The method of claim 18, wherein the step of sending a notice includes preventing the point of entry from accessing the money transfer system.

* * * * *

UNITED STATES PATENT AND TRADEMARK OFFICE
CERTIFICATE OF CORRECTION

PATENT NO.       : 8,019,679 B2
APPLICATION NO.  : 11/874694
DATED            : September 13, 2011
INVENTOR(S)      : Shannon Lee Bennett et al.

It is certified that error appears in the above-identified patent and that said Letters Patent is hereby corrected as shown below:

Column 11, lines 19-20, delete "trans-fers"

Column 11, line 63, delete "requests"

Column 12, line 11, delete "information received in the transaction request,"

Column 13, line 1, delete "to receive transaction requests from points of entry"

Column 13, line 49, delete "responses denying the transactions"

Signed and Sealed this
Fourteenth Day of August, 2012

David J. Kappos
*Director of the United States Patent and Trademark Office*